United States Patent

Daidoh et al.

[11] Patent Number: 6,144,776
[45] Date of Patent: Nov. 7, 2000

[54] IMAGE READER

[75] Inventors: Takahiro Daidoh, Hirakata; Makio Goto, Nara, both of Japan

[73] Assignee: Sharp Kabushiki Kaisha, Osaka, Japan

[21] Appl. No.: 09/063,518

[22] Filed: Apr. 21, 1998

[30] Foreign Application Priority Data

Apr. 24, 1997 [JP] Japan ................................ 9-107287

[51] Int. Cl.[7] .............................. G06T 5/00; G06T 1/40; H04T 1/40
[52] U.S. Cl. ........................ 382/274; 382/156; 358/461
[58] Field of Search .................................. 382/274, 139, 382/140, 156, 157, 158, 159, 160, 161, 155; 358/461; 704/232, 259; 706/2, 15, 16, 23

[56] References Cited

U.S. PATENT DOCUMENTS 5,778,279 12/1998 Kawai et al. .............................. 399/42
5,828,781 10/1998 Nakano .................................. 382/155
5,929,906 7/1999 Arai et al. ................................ 382/156

FOREIGN PATENT DOCUMENTS 7-336535 12/1995 Japan .
8-172531 7/1996 Japan .

Primary Examiner—Scott Rogers
Attorney, Agent, or Firm—Dike, Bronstein, Roberts & Cushman, LLP; David G. Conlin; David A. Tucker

[57] ABSTRACT

An image reader having a shading correction function includes a scanner for scanning an original, a converter for converting the received light from the original into electric signals and outputting the electric signal as data of an read image, and a corrector for carrying out a shading correction operation on the data of the read image on the basis of a shading correction value and outputting corrected image data. The corrector computes shading correction values for the whole reading face of the original platen from the shading correction value at an arbitrary position on the reading face and carries out the shading correction operation on the data of the read image on the basis of the computed shading correction values.

7 Claims, 6 Drawing Sheets

IMAGE READER

CROSS-REFERENCE TO RELATED APPLICATION

This application is related to Japanese application No. HEI9(1997)-107287, filed on Apr. 24, 1997 whose priority is claimed under 35 USC §119, the disclosure of which is incorporated by reference in its entirety.

BACKGROUND OF THE INVENTION

1. Field of the Invention

The present invention relates to an image reader, which is generally called a scanner, for reading an image on an original by optically scanning the original and outputting data of the read image as electric signals. The image reader is usually used aboard a digital copying machine, a facsimile machine, a color scanner or the like.

2. Description of Related Art

Conventional color image readers generally scan an original placed on a transparent original platen mainly composed of glass with light emitted from a light source and receive light reflected from the original to read an image on the original. For reading an color image, the image readers resolve the reflected light by some means into three components of light, i.e., R(red), G(green) and B(blue), and direct the three components on a light-receiving section of a photoelectric converter such as a CCD (charge-coupled device), which serves as a reading element, so as to convert them into analog electric signals of the three components R, G and B. The signals are then outputted in the form of digital electric signals by means such as an A/D converter.

In the above-described image readers, there arises a phenomenon called shading distortion owing to various causes such as variations in quantity of light from the light source, variations in conversion characteristics of photoelectric conversion elements defining pixels, changes in quantity of light from the light source caused by changes of voltage in the device, changes in the conversion characteristics of the photoelectric conversion elements with time, and variations in quantity of light passing through a lens for forming images. The shading distortion means that the electric signals outputted by the photoelectric converter vary and do not represent a constant value even if an image of a consistent shade of color is taken by the image reader through optical scanning and directed to the photoelectric converter.

Various attempts have been made for the correction of the shading distortion to minimize variations in outputted signals and always obtain constant electric signals, regardless of the above-mentioned causes, when reading an image of the consistent shade. Such correction is called shading correction.

A generally employed method for shading correction is setting a reference white sheet for white balance (hereafter referred to simply as white balance sheet) in a place other than the original platen on a travel path of an optical system which optically scans and reads an image on an original. This white balance sheet is optically scanned and the image thereof is read by the photoelectric converter before an original is optically scanned. On the basis of data of this read image, correction values for the signals representative of the R, G and B components are calculated for every photoelectric conversion element defining a pixel. Data of the read original is corrected by adding the calculated correction values.

As one example of such system, Japanese Unexamined Patent Publication No. Hei 7(1995)-336535 discloses a method for stable shading correction by setting a white balance sheet with bar codes representing colorimetric data for all photoelectric conversion elements, and reading the bar-code data and optically scanning the white balance sheet before reading the original, thereby to temper variations in shade of color which occur in the production of the reader.

Japanese Unexamined Patent Publication No. Hei 8(1996)-172531, on the other hand, discloses a method in which a white balance sheet is arranged on a scanning line on a original platen, and shading correction values for sites where the white balance sheet is not located are calculated from signal values of the white balance sheet by linear estimation.

The above-described methods for the shading correction have some effect in their own ways. That is to say, data of an image actually read can be outputted in a consistent shade by the correction of the data in consideration of the data outputted with regard to the white balance sheet.

However, the shading correction disclosed by Japanese Unexamined Patent Publication No. Hei 7(1995)-336535 cannot reduce variations in outputted signals all over a face for reading originals, though it can reduce variations in outputted signals among the photoelectric conversion elements to some extent. More particularly, when an original on the original platen is optically scanned, owing to such causes as changes in quantity of light from the light source and changes in angle of scanning light directed by the light source onto the scanning lines, images of the original which have the same shade may be represented by signals having different values depending on where on the original the images are located.

Also in the shading correction disclosed by Japanese Unexamined Patent Publication No. Hei 8(1996)-172531, it is extremely difficult to perform an accurate shading correction on sites where the white balance sheet is not located.

Therefore, by any of the shading correction methods or systems, it is very difficult to always perform a satisfactory correction to the entire original, and the shading distortion always occurs to some extent depending on in what part of the original platen the image to be read is located. Further, the shading correction methods require the reading of the white balance sheet every time before reading an image on an original, in order to perform shading correction on the basis of the white balance sheet. As a result, time necessary for reading tends to be long.

SUMMARY OF THE INVENTION

Under the above-mentioned circumstances, an object of the present invention is to provide an image reader which is adapted to allow for causes resulting in shading distortion such as changes in characteristics of photoelectric conversion elements and a light source and the like and make stable shading correction all over an original platen.

Particularly, an object of the present invention is to obtain the output of image data of a constant shade in the case where an image of the same shade is placed on the original platen, regardless of changes with time, changes in quantity of light of the light source and other changes.

In order to achieve the above-mentioned objects, the present invention provides an image reader having a shading correction function comprising a scanner for optically scanning an original placed on an original platen; a converter for receiving light reflected from the original, converting the received light into electric signals and outputting the electric signal as data of an read image; and a corrector for carrying out a shading correction operation on the data of the read image on the basis of a shading correction value which is calculated from a reference read data obtained by reading a reference original of uniform shade and outputting corrected image data, wherein the corrector computes shading correction values for the whole reading face of the original platen from the shading correction value at an arbitrary position on the reading face and carries out the shading correction operation on the data of the read image on the basis of the computed shading correction values.

With this construction, it is possible to perform the shading correction from the shading correction value at a certain point. Therefore, the shading correction can be performed to cover all the original platen. Particularly, by designating and inputting, as the certain point, a position requiring the shading correction, for example, a position where variations in scanning positions of the optical scanner or changes with time result in changes of output, the stable shading correction can be ensured.

DESCRIPTION OF THE PREFERRED EMBODIMENTS

In the image reader of the above-described construction, the corrector further comprises a neural network computing section to learn the relation ship between the coordinate value of the arbitrary position on the reading face and the shading correction value at the position and compute a shading correction value at a coordinate value other than the arbitrary position on the reading face on the basis of a result of learning. With this construction, the shading correction can reflect conversion characteristics of the photoelectric conversion elements, variations in the quantity of light of the light source for optical scanning and other factors of shading distortion with respect to every position on the original platen. Further, by use of the neural network for shading correction, information necessary for shading correction is only a weighting coefficient and a response function for neural network computation, that is a coupling coefficient in an intermediate layer of the neural network. Further, since the shading correction values are computed for the entire face of the original platen, the white balance sheet need not be optically scanned every time before the reading of an original, and therefore time necessary for reading can be shortened.

In the image reader of the above-described construction, time having passed since power-up of the image reader may be an input element of the neural network computing section for shading correction, in addition to the positional information. With this construction, it becomes possible to output shading correction values which reflects various factors such as voltages within the device which change in a relatively short time, e.g., in several hours, after the power source of the image reader is turned on. Thereby, even if the quantity of light or distribution of the quantity of light changes owing to voltage changes within the image reader after the power-up of the image reader, the shading correction can be performed always stably at every point on the original platen corresponding to a pixel.

In the image reader of the above-described construction, total time during which the image reader is in operation may be an input element of the neural network computing section for shading correction, in addition to the positional data. With this construction, it becomes possible to output shading correction values which reflect various factors such as the conversion characteristics of the photoelectric converter, e.g., the CCD, the characteristics of the light source and the like which change with time by the reading operation of the image reader in a long time such as several months or several years. Therefore, even if the characteristics of the photoelectric converter and the light source change after used for years, the shading correction can be performed always stably at every pixel on the original platen.

In the image reader of the above-mentioned construction, a signal representative of a change in environment around the image reader may be an input element of the neural network computing section for shading correction, in addition to the positional data. With this construction, it becomes possible to output shading correction data which reflects various factors such as environmental changes, for example, cloud of waterdrops on an inside surface of the original platen caused by a temperature change. Therefore, even if the inside surface of the original platen is clouded with moisture within the image reader, the shading correction can be performed always stably at every pixel on the original platen.

Further, the image reader of the above-mentioned construction may comprise first count means for counting time having passed since power-up of the image reader; second count means for counting total time during which the image reader is in operation; and a sensor for detecting a change in environment around the image reader. It can be externally selected whether or not a signal from each of the first count means, the second count means and the sensor is to be inputted, as an input element, to an input terminal of the neural network computing section. With this construction, it becomes possible to choose whether or not the above-mentioned input elements are individually reflected in the shading correction depending on the condition of the image reader and on accuracy required by an original when the original is actually read. Therefore, in the case where image data which does not require highly accurate shading correction is outputted, the time necessary for outputting the data can be shortened by selecting a neural network for shading correction which does not reflect these input elements.

The above and other objects and features of the present invention will be apparent from a consideration of the following description taken in connection with accompanying drawings wherein examples are illustrated by way of example. The examples should not be understood to limit the scope of the invention.

Embodiment 1

Figure 1:
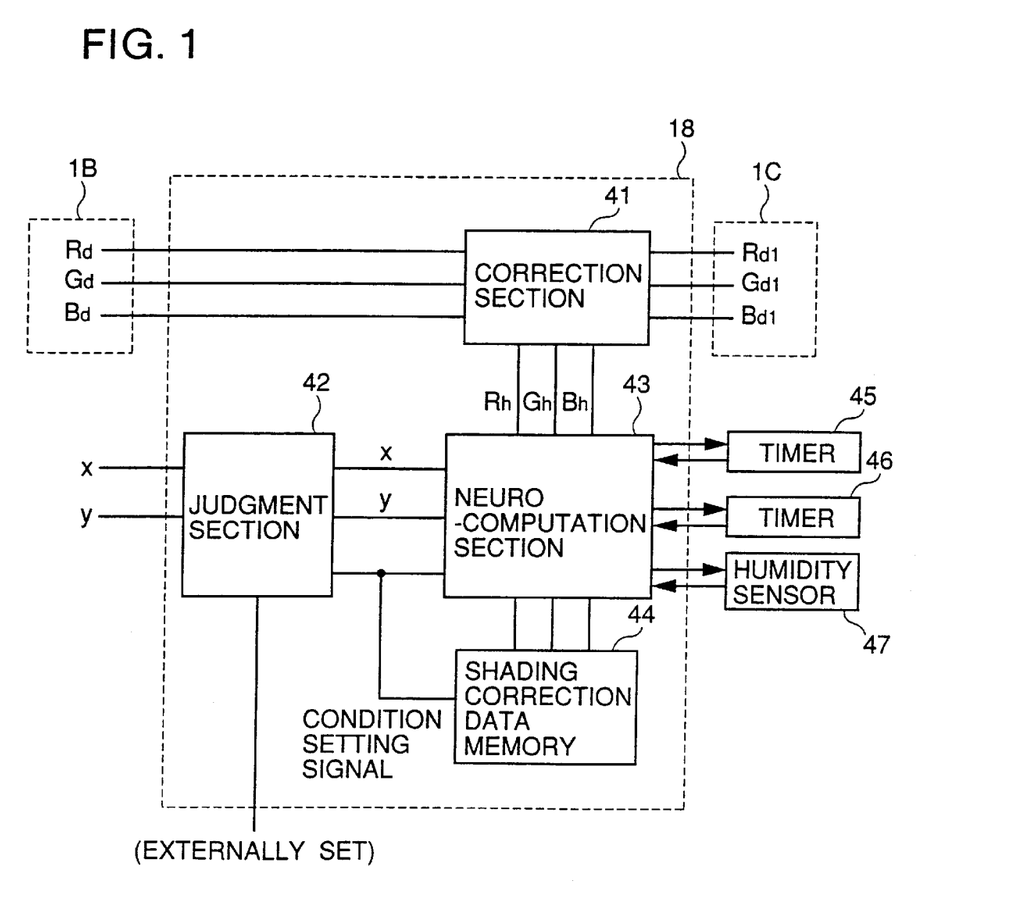
FIG. 1 is a block diagram illustrating an exemplary shading correction section in an image reader in accordance with the present invention.

An embodiment of the present invention is now described in detail with reference to the accompanying drawings. FIG.

Figure 2:
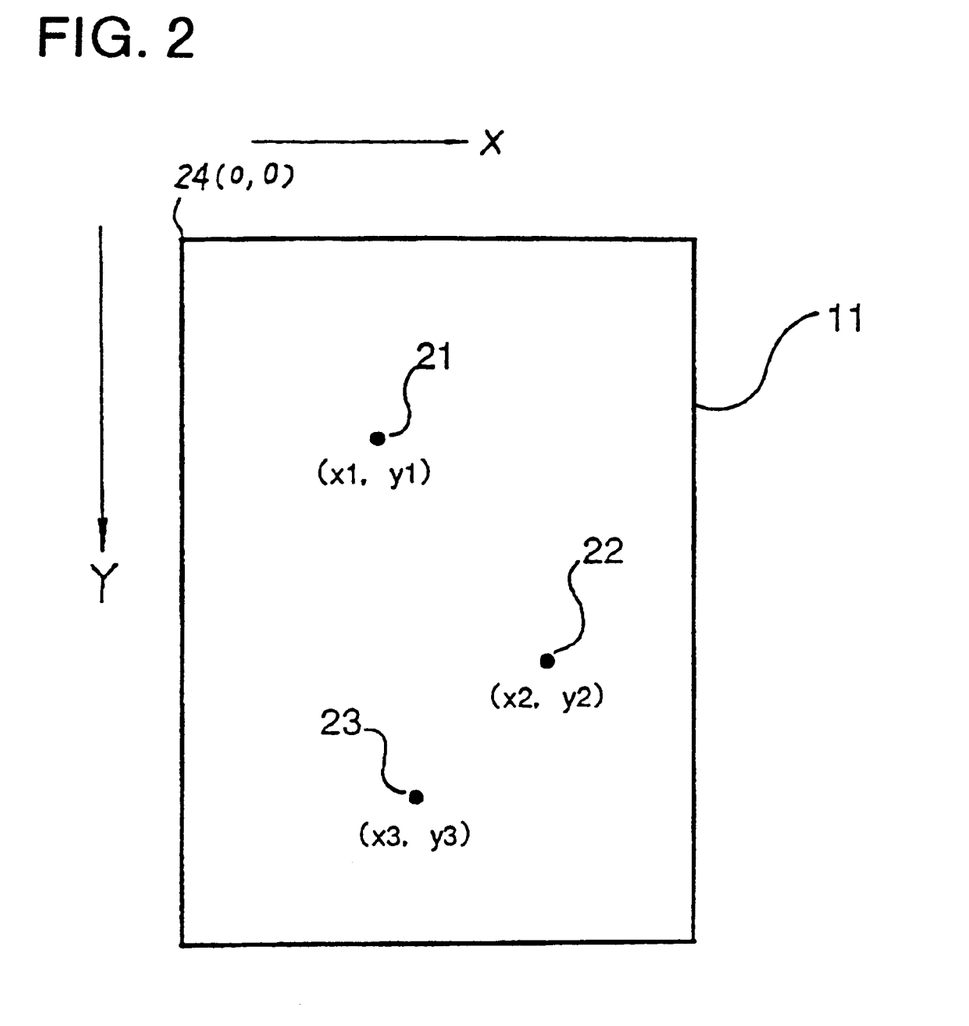
FIG. 2 is a plan view illustrating examples of measurement points whose positions are represented by coordinates on an original platen of an image reader in accordance with the present invention.
Figure 3:
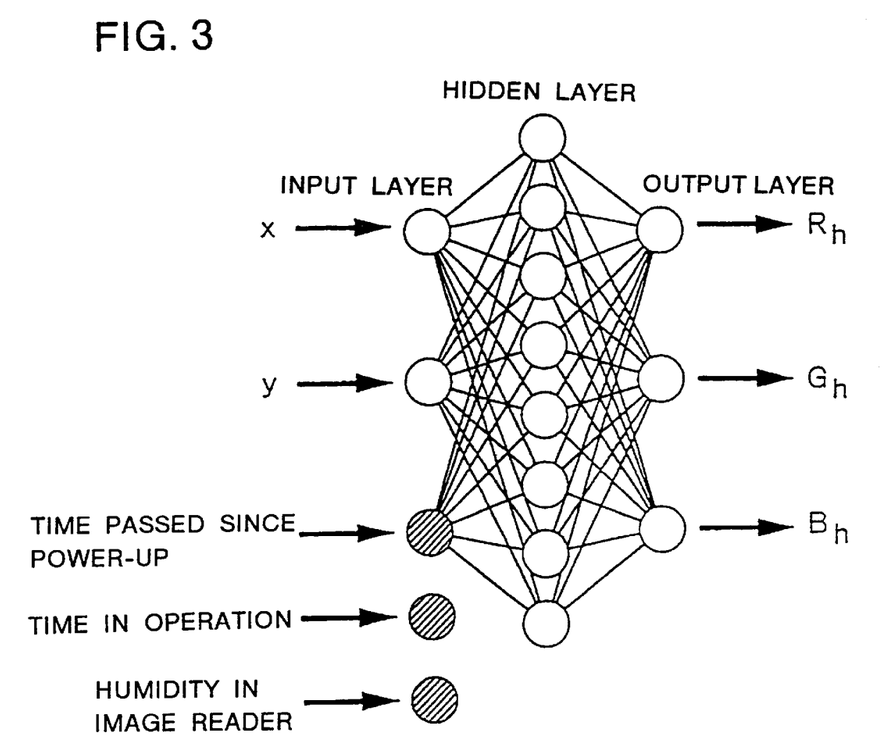
FIG. 3 shows an exemplary neural network employed in the shading correction section of FIG. 1.
Figure 4:
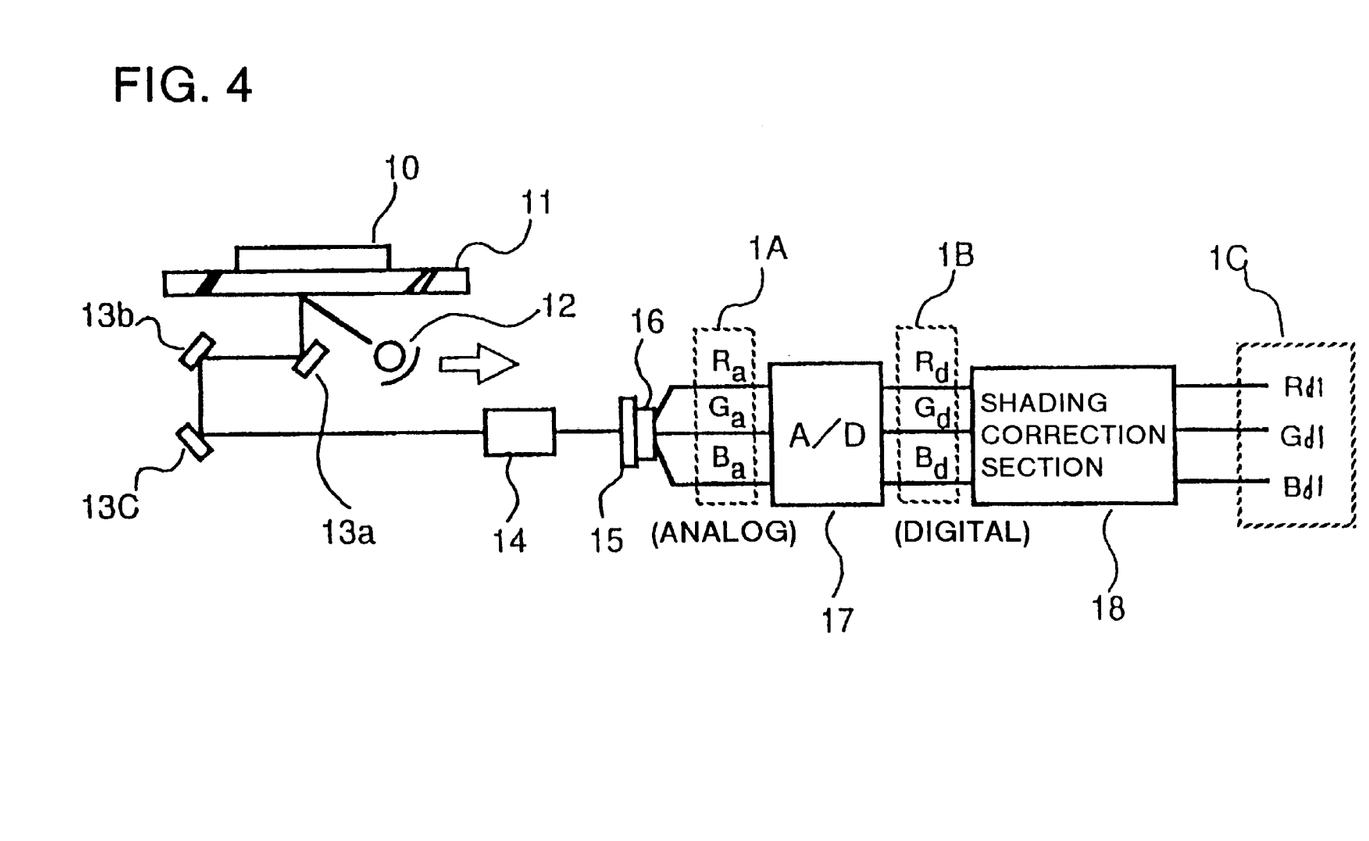
FIG. 4 is a schematic block diagram illustrating the construction of an image reader in accordance with the present invention including a circuit section of a shading correction section.

1 is a block diagram illustrating in detail a correction section employing a neural network for shading correction in an image reader in accordance with the present invention. FIG. 2 is a plan view illustrating a transparent original platen for placing an original thereon, particularly showing an example for arbitrarily inputting coordinate points for shading correction in accordance with the present invention. FIG. 3 shows an exemplary neural network employed in the shading correction in FIG. 1. FIG. 4 is a schematic block diagram illustrating the overall construction of an image reader provided with the shading correction section shown in FIG. 1.

First, referring to FIG. 4, the general construction of the image reader of the present invention is explained. In the image reader of the present invention, an original to be read is placed on a transparent original platen 11 and is scanned with scanning light from a light source 12 disposed below the original platen 11. Light reflected from the original is directed to a lens 14 for image formation by reflection mirrors 13a, 13b and 13c. The reflected light passing through the image formation lens 14, that is to say, a image of light from the original, is received by CCD elements 15 which act as a photoelectric converter. The CCD elements 15 are connected to a CCD driver 16 and output analog electric signals 1A (Ra, Ga, Ba) representative of the depth of components R, G and B via the driver. The analog signals 1A are then transferred to an A/D converter 17, which outputs digital signals 1B (Rd, Gd, Bd) of 8 bits for the R, G and B components as data of the read image. This read image data 1B of digital signals is transferred to a shading correction section 18, subjected to a number of processes of shading correction in the shading correction section 18 and is then outputted as a corrected image data 1C (Rd1, Gd1, Bd1) to the outside of the reader.

The above-mentioned CCD elements 15 are constructed as a linear sensor. More particularly, the photoelectric conversion elements of the CCD 15 are arranged in an X-direction with respect to the original platen 11 in FIG. 2. The A/D converter 17 and the shading correction section 18 are comprised of dedicated IC circuits.

In the image reader of the present invention, the light source 12 and the reflection mirrors 13a, 13b and 13c move in the direction of an arrow shown in FIG. 4 to optically scan the original line by line. By repeating the output regarding the light reflected by the original in the above-described manner, the image on the original can be read and the data of the read image can be outputted as electrically converted data.

The shading correction section 18 in accordance with the present invention performs shading correction. More particularly, the shading correction section 18 carries out a shading correction operation on the read image data 1B, and outputs the corrected image data 1C. For this purpose, a reference white sheet for white balance (a white balance sheet) 10 is placed on the original platen 11 so that the read image data thereof is obtained by the CCD 15 and stored beforehand as reference read data as it is. Shading correction values are so determined to allow all the reference read data to be corrected to be the same. These shading correction values are stored beforehand together with the above reference read data.

The shading correction section 18 performs the shading correction operation on the basis of the shading correction values. In other words, for performing shading correction which allows for variations in quantity of light from the light source 12 described later, voltage change, changes with time or the like, image data corrected on the basis of the shading correction values is outputted by the shading correction section 18.

In the image reader with the shading correction values thus pre-stored, when an original to be read is actually put on the original platen 11, the read image data 1B of the original is outputted by the CCD 15, the read image data 1B is subjected to the shading correction operation based on the previously obtained shading correction values, and eventually the digital signal 1C after the shading correction is outputted as image data.

Thus, even if the output from the CCD 15 is not uniform with respect to the white balance sheet of uniform shade because of voltage change, variations in the quantity of light from the light source, variations in distribution of the quantity of light and changes with time of the image reader, stable image data in a constant state can always be outputted.

However, a lot of time and a memory of great capacity are required for obtaining the reference read data and corresponding shading correction values (referred to as light measurement for short) for the above shading correction all over the original platen 11. In view of this disadvantage, in the present invention, a plurality of points are designated on the original platen 11, the shading correction values are obtained on the designated points, and the shading correction operation is carried out on the basis of the obtained shading correction values. Thereby the memory does not need so much capacity for storing the shading correction values. Further time necessary for the correction can be reduced. This reduction of the correction time means that the shading correction values can be obtained and the shading correction can be carried out every time when the scanning is done for reading. However, explained here is an embodiment which dose not require the white balance sheet to be scanned to provide the shading correction values before the reading of an original.

The obtaining of the shading correction values in accordance with this embodiment is now described in further detail. Before shipment of the image reader, a white balance sheet 10 for the shading correction as described above is placed to cover an entire surface of the original platen 11 shown in FIG. 4. A white surface of an original cover (not shown) may be utilized as the white balance sheet 10. Using this white balance sheet 10, colorimetric data (the aforesaid digital reference read data of the R, G and B components of the reflected light in the case of color images) is obtained only with regard to the designated points and stored.

FIG. 2 is a plan view illustrating the original platen 11 shown in FIG. 4. A plurality of arbitrary points (pixels) on the original platen 11 are designated as measurement points. The reference numerals 21, 22 and 23 in FIG. 2 denote exemplary measurement points. The number of measurement points and the positions thereof are not particularly limited and may be set suitably. Usually, it is desirable to designate tens to hundreds of points.

Here, a certain point on the original platen 11 is designated as an origin, the coordinates of the above-mentioned measurement points 21, 22 and 23 can be determined with respect to this origin. The position of the origin and a coordinate system may be set arbitrarily. For simplicity of explanation, in FIG. 2, one vertex 24 of the original platen 11 is set as the origin (0, 0) and a coordinate system is set to have an X coordinate axis in the scanning direction (the direction in which the CCD elements are arranged) and a Y coordinate axis in the direction in which the light source moves. Thereby, the coordinates representative of the positions of the measurement points 21, 22 and 23 are determined uniquely as (x1, y1) (x2, y2) and (x3, y3), respectively.

After the designation and input of the measurement points, the light source 12 is moved to optically scan the white balance sheet 10. Digital image data outputted by the A/D converter 17 is stored with correspondence to the measurement points. Thus, digital signals of the R, G and B components when the white balance sheet 10 is read (i.e., reference colorimetric data) are obtained with regard to the measurement points designated as described above.

The shading correction values with respect to the components R, G and B on the measurement points are calculated from the reference colorimetric data on the measurement points.

The shading correction values are for allowing outputs about the measurement points by the CCD elements to be the same with regard to the same shade, i.e., the white balance sheet 10. The shading correction values are obtained for each of the predetermined measurement points such as 21, 22 and 23 as described above. That is, the shading correction values are determined corresponding to the measurement points as shown in the following Table 1. FIG. 2 illustrates the example wherein the number of measurement points is three, but an arbitrary number n of points can be designated.

TABLE 1

| | Measurement Points | | Shading Correction Values | | |
| --- | --- | --- | --- | --- | --- |
| | x coordinate | y coordinate | $R_h$ | $G_h$ | $B_h$ |
| 1 | $x_1$ | $y_1$ | $R_{h1}$ | $G_{h1}$ | $B_{h1}$ |
| 2 | $x_2$ | $y_2$ | $R_{h2}$ | $G_{h2}$ | $B_{h2}$ |
| 3 | $x_3$ | $y_3$ | $R_{h3}$ | $G_{h3}$ | $B_{h3}$ |
| ... | ... | ... | ... | ... | ... |
| n | $x_n$ | $y_n$ | $R_{hn}$ | $G_{hn}$ | $B_{hn}$ |

By reference to the shading correction values on the measurement points shown in the above table 1, a neural network having a learning mechanism is constructed, as shown in FIG. 3, in which the positional coordinates (x, y) of the pixels on the original platen 11 are inputted in an input layer and the shading correction values (Rh, Gh, Bh) for the components R, G and B at the pixels are outputted from an output layer. This neural network learns from the shading correction values (Rh, Gh, Bh) on the measurement points as teaching signals and function as a neural network (referred to as neuro hereafter) for shading correction. In other words, using the known shading correction values (Rh, Gh, Bh) pre-obtained on the measurement points as teaching signals, the neural network is taught. By this learning, shading correction values covering the entire surface of the original platen can be outputted from the output layer of the neural network, and on the basis of the outputted correction values, the shading correction is performed.

This neural network for shading correction is adapted to reflect characteristics of inner workings within the image reader at the scanning of the white balance sheet 10, the inner workings including the CCD elements 15 having different conversion characteristics for the individual pixels and the light source 12 having variations in amount of light.

The neural network shown in FIG. 3 in accordance with the present invention is a part of the shading correction section 18 in FIG. 4. The details of the shading correction section 18 are shown in FIG. 1.

The shading correction section 18 shown in FIG. 1 includes a correction section 41, a judgment section 42, a neuro-computation section 43 (an computation section comprised of the neural network shown in FIG. 3) and a memory 44 for storing shading correction data.

In FIG. 1, the reference numeral 1B represents read image data comprised of digital signals A/D converted from the analog data 1A outputted by the CCD elements 15 via the driver 16, as explained with reference to FIG. 4. The read image data 1B is inputted to the shading correction section 18. The correction section 41 performs the shading correction operation on the above read image data 1B on the basis of the shading correction values and outputs the corrected image data 1C, as described previously.

The above-mentioned shading correction data memory 44 stores, as shading correction data, learned results obtained by learning the shading correction values on the measurement points shown in Table 1, that is, neuro computation data which is comprised of coupling coefficients in an intermediate layer of the neural network. The stored data is sent to the neuro-computation section 43, which outputs shading correction values to the correction section 41. Thereby, the shading correction operation is carried out on the read image data as described above and the output image data IC is outputted.

To the judgment section 42, the measurement points such as 21, 22 and 23 on the original platen 11 are inputted in the form of positional coordinates (x, y) of the pixels for reading together with the read image data 1B. The judgment section 42 is provided with a function of designating an area on the original described later.

As described above, at an initial stage, the white balance sheet 10 of uniform shade is put on the original platen 11, and using this white balance sheet 10, the uniform shade is read. Data about the measurement points obtained at this time by reading the white balance sheet 10 placed on the original platen 11 is inputted as digital signals 1B of the R, G and B components from the A/D converter 17 to the correction section 41. This read image data 1B is stored as the reference colorimetric data in the shading correction data memory 44. In this case, read image data only at the arbitrary measurement points 21, 22 and 23 in FIG. 2 or on the lines including the measurement points 21, 22 and 23 may be stored in order to reduce the amount of stored data, as explained previously.

It is preferable to store results learned by the neural network with regard to environmental changes such as changes with time, voltage change and humidity change. That is to say, such changes are caused purposely, and the image reading scanning and reading by the image reader is carried out using the same white balance sheet 10 as used for reading at the initial stage. It is desirable to store the shading correction data obtained by the neural network as the results of learning from this reading.

For this purpose, on the basis of the reference colorimetric data on the measurement points at the occurrence of the environmental changes, the neural network is made to learn as the next step. More particularly, in the neural network computation section (neuro-computation section) 43, the designated measurement points (21, 22, 23) on the original platen 11 are inputted in the input layer thereof and the shading correction values (Rh, Gh, Bh) on the respective pixels at the environmental change are outputted from the output layer thereof, and this neuro-computation section learns with the shading correction values (Rh, Gh, Bh) on the respective pixels at the environmental change as the teaching signals. The coupling coefficients thus learned by the neural network are stored in the memory 44 as the shading correction data. In this manner, the learning with regard to the measurement points on the original platen 11 is done, and the shading correction data at the environmental changes as the results of learning are stored in the memory 44.

After this learning, when an actual original is read by the image reader, the shading correction operation is carried out on the read image data 1B by the correction section 41, on the basis of shading correction values obtained via the neural network from the shading correction data stored in the memory 44, and thus the corrected image data 1C is outputted. In other words, a set of read image data 1B representative of an image is sequentially shading-corrected on the basis of the shading correction values obtained by the neuro-computation section 43 and outputted as image data 1C.

Embodiment 2

The read image data of an original placed on the original platen 11 is sequentially inputted to the correction section 41 by optical scanning. At this time, the shading correction operation is carried out on the basis of the shading correction data learned as described above by reference to the arbitrary points, i.e., the measurement points 21, 22 and 23. In this case, an area from an end of the original platen 11 to the measurement point 21 may be corrected by reference to the shading correction values obtained at the measurement point 21, and then an area up to the measurement point 22 may be corrected by reference to the shading correction values obtained at the measurement point 22.

In the above-described embodiments, the measurement points 21, 22, 23, etc. are arbitrarily designated, and these points are the base for the shading correction of the entire original. Alternatively, an area may be designated for shading correction on the original platen 11, and the shading correction operation as described above may be carried out on the area. For example, areas may be separately designated on the original platen beforehand in correspondence with the measurement points such as 21, 22 and 23. During the scanning of the area, the shading correction operation may be carried out on the area by means of the neuro-computation section 43 which obtains the shading correction values as described above.

Embodiment 3

Here, changes with time of the image reader can be compensated as environmental changes using shading correction data obtained by learning of the neural network. For this purpose, a plurality of points of time for measurement are designated at given intervals from an initial stage to the end of life of the image reader. The image reader is imitatively subjected to aging, and the neuro network learns on the basis of the shading correction values in the above-described manner and the results of learning are stored in the memory 44 as the shading correction data.

A timer 46 is provided outside of the shading correction section 18 as shown in FIG. 1. The timer 46 counts the time during which the image reader is in operation since its initial stage. Output from the timer 46 is inputted to an terminal of the input layer of the neural network shown in FIG. 3. With this construction, in response to the output of the timer 46 at the given intervals, the corresponding shading correction data is called up and the neuro-computation is conducted thereby to obtain shading correction values.

In the above-mentioned timer 46, the time for which the power source of the reader is on and the reader is in operation is accumulated and stored. When the given time period has passed, the above-described computation by the neural network is conducted and the shading correction values is outputted.

Accordingly, if the characteristics of the CCD elements 15 and the light source 12 change with time, shading correction values for the pixels on the original platen 11 can be stably obtained by the neural network and the shading correction is performed.

The above-mentioned timer 46 may count the number of times of to-and-fro motion of the optical scanner such as the light source 12 instead of time itself.

Embodiment 4

In the image reader, the quantity of light from the light source 12 changes as the supply voltage changes. For this reason, the read image data 1B is not constant and therefore the output 1C becomes unstable. According to the following manner of the present invention, however, the shading correction operation is able to compensate for possible changes in the quantity of light from the light source 12 caused by changes in the supply voltage, so that constant output can be obtained.

For this purpose, a plurality of points of time for measurement are set during the time from the power-up of the image reader to the stabilizing of the voltage within the image reader. The image reader is subjected to the aging. At the measurement time points, the shading correction values of the R, G and B components are obtained at the measurement points. Thereby plural sets of the shading correction values such as shown in Table 1 are created at the respective measurement time points.

A neural network in which the time having passed since the power-up is added to items inputted to the input layer, as shown in FIG. 3, is made to learn with the known shading correction data on the measurement points at the measurement time points as teaching data. The results of learning are stored in the memory 44 as the shading correction data allowing for the time having passed since the power-up.

For this purpose, a time (a first count means) 45 is provided outside of the shading correction section 18 for counting the time having passed since the power-up. Output from the timer 45 is inputted as an input element to an input terminal of the input layer of the neural network shown in FIG. 3.

Accordingly, the shading correction values can be obtained in an unstable state of the supply voltage just after the power-up, and the shading correction operation can be performed as allows for voltage change while the original is read.

That is to say, even if the quantity of light or the distribution of the quantity of light from the light source 12 changes due to voltage change during the reading of an image after the power-up, the shading correction can always be performed stably for the pixels on the original platen 11.

Further, in addition to the voltage change, environmental changes such as temperature change and humidity change which may arise in a place where the image reader is located can cause changes in the quantity of light form the light source 12 or output characteristics of the CCD elements.

To cope with such changes, a sensor 47 is provided in the image reader for detecting a change in the environment. For example, a humidity sensor (a hygrometer) 47 is provided to detect a change in humidity, and the neural network is made to learn with regard to the detected change.

The humidity sensor 47 is provided outside of the shading correction section 18 to measure the humidity within the image reader. Output from the humidity sensor 47 is inputted to an input terminal of the input layer of the neural network shown in FIG. 3.

The humidity is changed to a number of levels. At each of the levels, the shading correction values are obtained at the measurement points as shown in Table 1 and stored. Then, the above-described neural network 43 is made to learn with the obtained shading correction values as the teaching signals. The results of learning are stored in the memory 44 as the shading correction data and the shading correction which allows for the humidity change is performed.

Thus, even if dew condensation or the like are caused in the image reader by an environment change, particularly by a change in humidity, a stable shading correction can always be performed at the reading points on the original platen.

Embodiment 5

The above-described shading correction concerning changes in the supply voltage to the light source or the like, changes with time of the reading device in operation and changes in environment can be optionally carried out by use of the neuro-computation section 43. In this embodiment, the setting of the shading correction can optionally be selected to allow for these changes. For example, in the case where the image reader is used where the humidity is unlikely to change, it is not necessary to conduct shading correction which allows for humidity changes. Therefore, by omitting such process, the time necessary for the shading correction can be reduced.

For the optional selection, selection signals representing whether or not the shading correction is carried out with regard to changes in the supply voltage to the light source or the like, changes with time of the reading device in operation, changes in environment and the like are externally inputted to the judgment section 42 in FIG. 1. In response to the input of the selection signals, the signals from the timers 45 and 46 and the humidity sensor 47 as shown in FIG. 1 are selectively inputted to the input terminals of the neuro-computation section 43 which are different from the input terminal for the positional information represented by the coordinates (x, y), as shown in FIG. 3.

Thereby, the neuro-computation section 43 can selectively conduct the neuro-computation for the shading correction on condition of inputs from the timers 45 and 46 and the sensor 47.

A user can optionally select each of the inputs from the timers 45 and 46 and the sensor 47, and can omit an unnecessary one thereof. The judgment section 42 judges the selection of the user and transfers an instruction about the selection as a condition setting signal to the neuro-computation section 43. On the receipt of the signal, the neuro-computation section 43 internally load shading correction data to be used, and at the same time, outputs a signal for requiring the input of the timer 45, the timer 46 or the humidity sensor 47. In response to the signal, the timer 45, the timer 46 or the humidity sensor 47 outputs a signal representative of passed time or humidity to the neuro-computation section 43. From the signal(s) and computation data, the neuro-computation section 43 computes shading correction values for the R, G and B components and outputs to the correction section 41.

Figure 5:
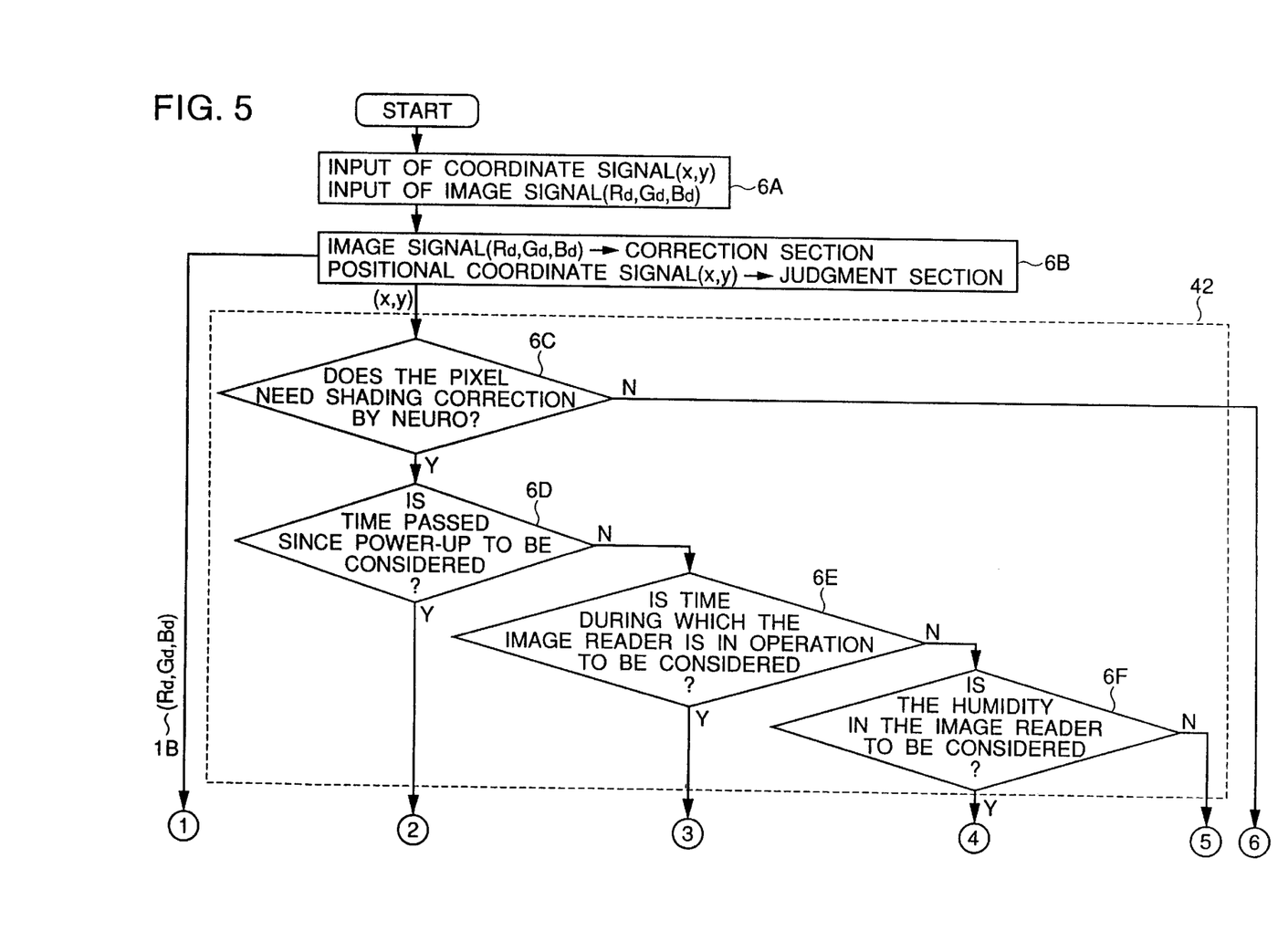
FIG. 5 is a control flowchart explaining exemplary processing steps by the shading correction section shown in FIG. 1.
Figure 6:
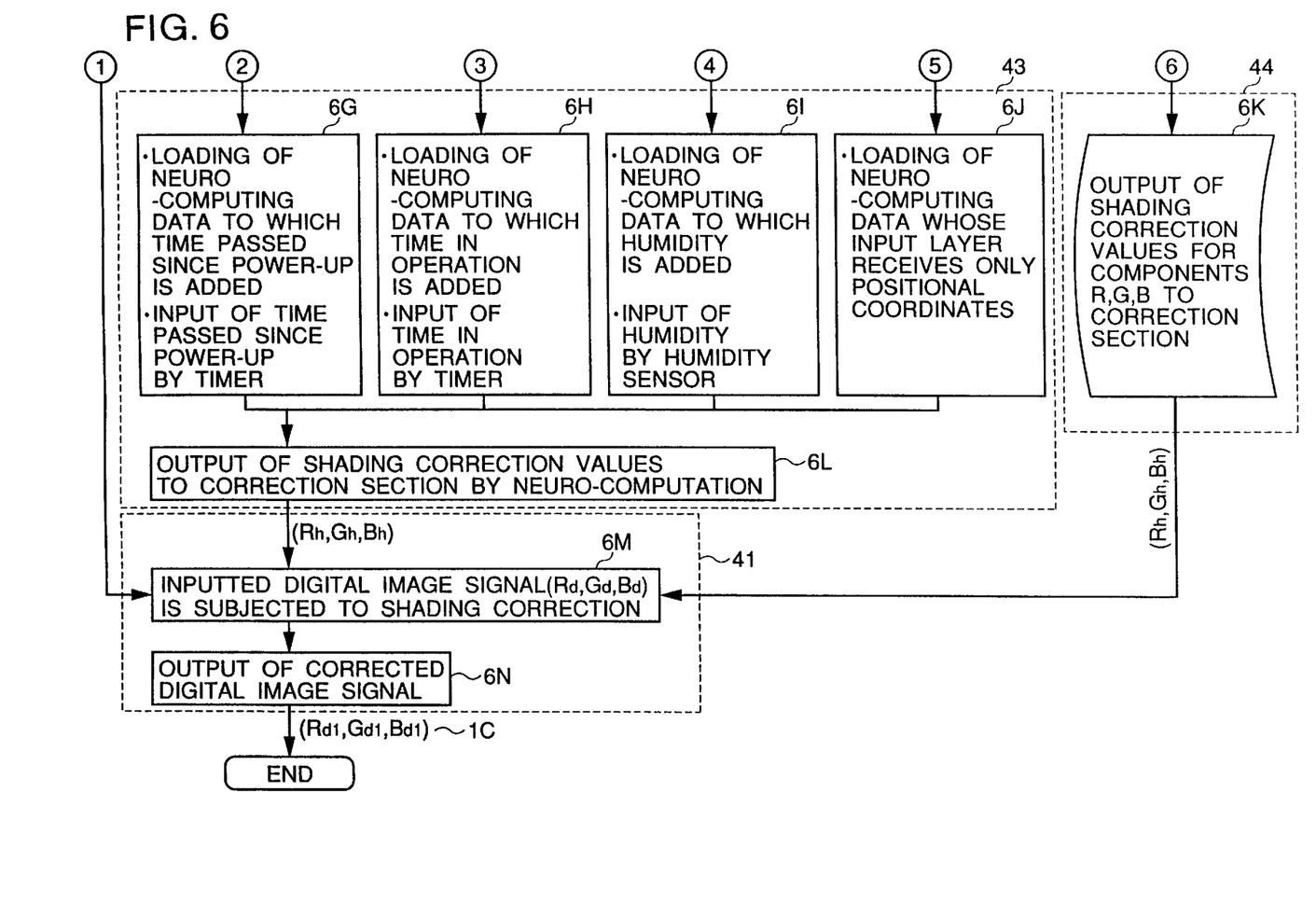
FIG. 6 is a control flowchart explaining processing steps following the steps shown in FIG. 5.

Referring to flowcharts shown in FIGS. 5 and 6, now described are control of the shading correction in accordance with the present invention and a flow of a shading correction process in the case where the inputted conditions are optionally selected as described above. In FIGS. 5 and 6, portions enclosed by dotted lines represent processes in the individual sections (circuits) shown in FIG. 1 and denoted by the same reference numerals.

First, when the reading of an original placed on the original platen 11 is started, read image data 1B thereof (in the case of a color image, 1B is composed of Rd, Gd and Bd) and a positional coordinate signal (x, y) at that time are outputted and inputted to the circuitry shown in the block diagram of FIG. 1 (Step 6A) The read image data 1B and the positional coordinate signal (x, Y) are sent to the correction section 41 and the judgment section 42, respectively (Step 6B). Therefore, the read image data 1B proceeds directly to Step 6M by the correction section 41.

The positional coordinate signal (x, y) sent to the judgment section 42 is judged by the judgment section 42 as to whether or not this positional coordinate signal corresponds to a pixel of a coordinate which needs the shading correction by the neural network externally designated before hand in Step 6C first. If the positional coordinate signal is judged not to need the shading correction by the neural network, the process goes to the shading correction data memory 44. For this signal, a shading correction value previously stored in the memory 44 is read out of the memory 44 (Step 6K in FIG. 6), and this data is outputted to the correction section 41 (Step 6M).

On the other hand, if the positional coordinates (x, y) are judged to need the shading correction by the neural computer, it is then judged in Steps 6D to 6F whether to conduct shading correction allowing for factors such as time having passed since the power-up, total time during which the image reader is in operation and the humidity within the device.

After the completion of the operation by the judgment section 42, the process goes to the neuro-computation section 43. In accordance with the judgments in Steps 6G to 6J, computation data and inputted values required for the neuro-computation are loaded. The computation data is the shading correction data and is loaded from the memory section 44. In the case where the inputs from the timers 45 and 46 and the sensor 47 are not externally instructed, the computation is conducted by the neuro-computation section 43 only on the basis of the positional data (Step 6J).

The results from the above-described computations of the neuro-computation section 43 are sent to the correction section 41 as the shading correction data. That is to say, the neuro-computation is carried out from the above-mentioned computation data and the inputted values in Step 6L to calculate the shading correction values (Rh, Gh, Bh).

These values are outputted to the correction section 41, and by use of this data, the shading correction operation is carried out (Step 6M) on the read image data which is already inputted to the correction section 41 in the above-mentioned Step 6B. Thus the corrected image date 1C is outputted to the outside (Step 6N).

In the case where the shading correction values does not need to be obtained by the neuro-computation section 43, the shading correction values are read out of the shading correction data memory 44 in Step 6K and sent to the correction section 41, as described above. By use of these values, the shading correction operation is carried out on the read image data in the correction section 41 as described above, and the corrected read image data is outputted as the image data 1C.

Thus, according to the invention, the shading correction can be performed on the entire original platen by obtaining the reference colorimetric data and the shading correction values on the basis thereof with regard to a part of the original platen, but not with regard to the entire area of the original platen as in the conventional image readers. The neural network learns beforehand on the basis of the shading correction values at the arbitrarily designated position such as the measurement points 21, 22 and 12 shown in FIG. 2, the results of learning, i.e., the shading correction data is taken into the neural network, and the neuro-computation section 43 outputs the shading correction values. Therefore, the correction after reading the original is done swiftly. Besides, since the shading correction values are partially obtained in the neuro-computation section 43, the shading correction can be effectively performed at a point at which changes with time are significant, and a stable shading correction is ensured.

According to the image reader of the present invention, the shading correction values are obtained on the basis of the positional coordinates of pixels for reading on the original platen, the shading correction values are obtained with regard to the whole reading face of the original platen, and the shading correction operation is conducted by use of the obtained shading correction values. Therefore, a stable shading correction which covers the whole area of the original platen can be done.

Further by utilizing the neural network for obtaining the shading correction values, the stable shading correction can be done on the entire original platen in a shorter reading time than the conventional image reader.

Still further, the neural network which learns about the additionally inputted time having passed since the power-up is utilized for the shading correction. Therefore, even if the quantity of light from the light source or the distribution of the quantity of light changes with voltage changes occurs in the device after the power-up of the device, the stable shading correction can always be done at the pixels on the original platen.

Further, with respect to changes with time in characteristics of the image reader, the shading correction can be carried out by utilizing the neural network. Therefore, the stable shading correction can be done regardless of changes in the characteristics of reading elements through the optical scanning. With respect to changes in environment, the stable shading correction can also be done.

Where the image reader is constructed to have the choice as to whether to use the input of the above described conditions or changes for the shading correction, any of the above described conditions or changes can be omitted from the shading correction in the case where a particularly accurate correction is not required. Thus, the time necessary for the shading correction can be shortened.

What is claimed is:

1. An image reader having a shading correction function comprising:

a scanner for optically scanning an original placed on an original platen;

a converter for receiving light reflected from the original, converting the received light into electric signals and outputting the electric signal as data of an read image; and a corrector for carrying out a shading correction operation on the data of the read image on the basis of a shading correction value which is calculated from a reference read data obtained by reading a reference original of uniform shade and outputting corrected image data, wherein the corrector computes shading correction values for the whole reading face of the original platen from the shading correction value at an arbitrary position on the reading face and carries out the shading correction operation on the data of the read image on the basis of the computed shading correction values.

2. An image reader according to claim 1, wherein the corrector further comprises a neural network computing section to learn the relationship between the coordinate value of the arbitrary position on the reading face and the shading correction value at the position and compute a shading correction value at a coordinate value other than the arbitrary position on the reading face on the basis of a result of learning.

3. An image reader according to claim 2, wherein time having passed since power-up of the image reader is an input element of the neural network computing section, in addition to information of the arbitrary position.

4. An image reader according to claim 2, wherein total time during which the image reader is in operation is an input element of the neural network computing section, in addition to information of the arbitrary position.

5. An image reader according to claim 2, wherein a signal representative of a change in environment around the image reader is an input element of the neural network computing section, in addition to information of the arbitrary position.

6. An image reader according to claim 2 further comprising first count means for counting time having passed since power-up of the image reader; second count means for counting total time during which the image reader is in operation; and a sensor for detecting a change in environment around the image reader, wherein whether or not a signal from each of the first count means, the second count means and the sensor is to be inputted as an input element to an input terminal of the neural network computing section is able to be externally selected.

7. An image reader according to claim 1, wherein the data of the read image comprises digital colorimetric data of three colors, red, green and blue, and the shading correction value comprises three correction values for red, green and blue.

* * * * *